Jan. 12, 1926.

L. M. BARSTOW

ADJUSTABLE STUB AXLE JOINT

Filed March 23, 1925

1,569,311

Inventor,

L. M. BARSTOW.

By Sterling P. Buck,

Attorney.

Patented Jan. 12, 1926.

1,569,311

UNITED STATES PATENT OFFICE.

LAWRENCE M. BARSTOW, OF INDEX, WASHINGTON.

ADJUSTABLE STUB AXLE JOINT.

Application filed March 23, 1925. Serial No. 17,655.

*To all whom it may concern:*

Be it known that I, LAWRENCE M. BARSTOW, a citizen of the United States, residing at Index, in the county of Snohomish and State of Washington, have invented certain new and useful Improvements in Adjustable Stub Axle Joints, of which the following is a specification.

This invention relates to vehicle axles, and especially to an improved adjustable stub axle joint.

It is well known that the steering mechanism of most all modern land vehicles, especially motor vehicles, includes a jointed axle having two spindles on which the wheels are mounted to rotate, and that the bottoms of the wheels must be closer together than the tops thereof, in order that the wheels may travel properly. If the wearing of the pivotal joints of the axle permits the wheels to be as close to one another at the top as at the bottom, the wheels travel improperly, and often cause the vehicle to travel in a side-to-side manner which is known as "shimmying". Such side-to-side motion is not only very detrimental to the wheels, axles, and other parts of the vehicle, but also renders the guiding of the vehicle very difficult, resulting in danger and in actual serious accidents.

The main object of this invention is to provide means for making such adjustment that not only prevents looseness of the pivotal connections, but constantly tends to preserve the above-mentioned relative positions of the wheels, that is, keeping their bottoms closer together than their tops.

Another object is to provide a device of this character which is of comparatively simple construction, strong, durable, convenient and thoroughly efficient and practical.

Figure 1:
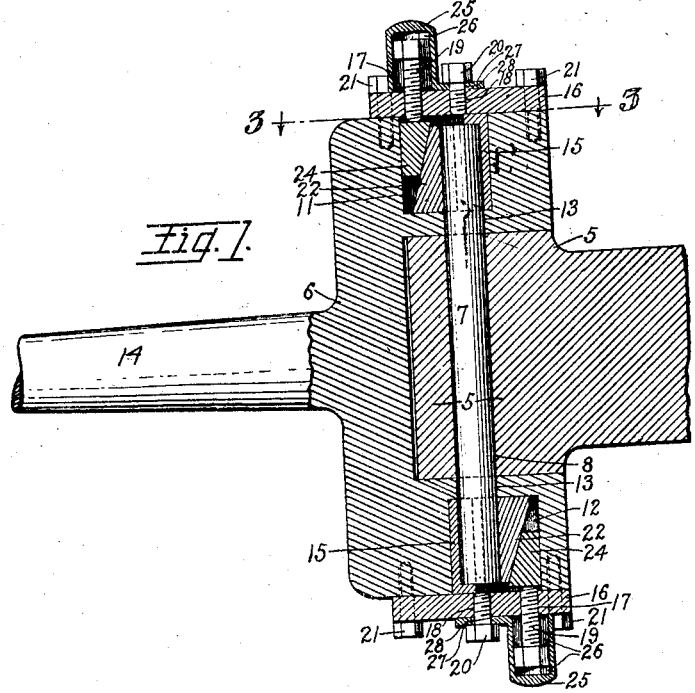
Figure 2:
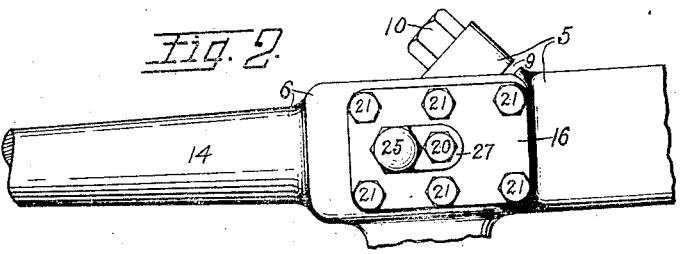
Figure 3:
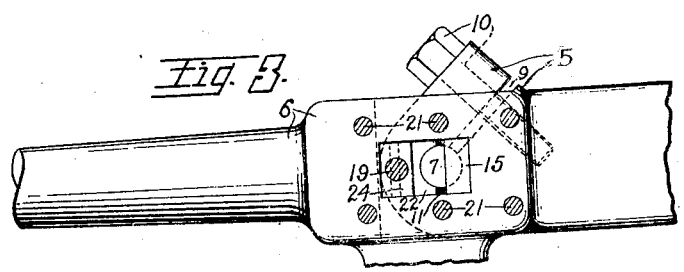

Other objects and important features are pointed out or implied in the following details of description, in connection with the accompanying drawings in which:

Figure 1 is an axial vertical section through one of the pivotal connections of the jointed vehicle-axle, which includes my invention. Figure 2 is a top plan view. Figure 3 is a horizontal sectional view, the sections being in the plane indicated by line 3—3 of Figure 1.

Referring to these drawings in detail, in which similar reference characters correspond to similar parts throughout the several views, the main or intermediate member of the axle is indicated at 5, and the spindle section is indicated at 6; but it is to be understood that these two axle members may be reversed, that is, that the member 5 may be bifurcated as the present drawings show the member 6 to be, and vice versa. Therefore, these two parts 5 and 6 will hereinafter be referred to by the broad term "axle members". The axle member 5 embraces the central or intermediate part of the pivote or pin 7 so tightly that this pivot cannot turn therein. In order that it may thus embrace such pivot, the bore 8, through which the pivot extends, may communicate with a slot 9 through which bolts 10 extend, and by keeping these bolts tight, the pivot 7 is tightly clamped so it cannot turn in the bore 8, and therefore does not wear the bore or wear within the bore.

The axle member 6 is provided with upper and lower cavities 11 and 12 which communicate with bores 13 in the upper and lower furcations of the axle member 6 and through these bores 13, the pivot 7 extends into the cavities 11 and 12. Now, referring specifically to the form of the invention here shown, and considering the parts facing towards the spindle 14 to be the outer parts, it will be seen that the lower cavity 12 has a bearing element 15 fitted snugly and immovably therein, while the upper cavity 11 has a similar bearing element 15 in its inner side, that is, on the side of the pivot 7 opposite to that side against which the lower bearing element 15 is fitted. These elements 15 are immovable because of their contiguity, respectively, with upper and lower retaining plates 16 which entirely cover the respective upper and lower openings of the cavities 11 and 12, that is, when the openings 17 and 18 of these plates are closed by means of threaded plugs or screws 19 and 20. The plates 16 are also apertured for the reception of screws or stud-bolts 21 which are threaded into the upper and lower parts of the member 6 and are removable for the purpose of removing the retaining plates if such removal should become necessary or desirable.

A wedge-shaped bearing element 22 is fitted against the outer side of the pivot 7, at the upper end of the latter, and a similar bearing element 22 is fitted against the inner side of the lower end of the pivot 7, each of these bearing elements being spaced a distance from the wall of the cavity in which it is contained. A wedge 24 is fitted between the outer side of the upper wedge-shaped bearing element 22 and the wall of the upper cavity 11, and a similar wedge 24 is fitted against the inner side of the wedge-element 22 of the lower cavity 12. These wedges 24 are in such relation to the screws 19 that they are forced into wedging action against the respective elements 22 when their respective screws 19 are turned for screwing them inward through the respective plates 16.

From the foregoing description, it will be seen that the respective wedges of the upper and lower cavities tend to force the lower furcation of the axle member 6 inward, and the upper one outward with respect to the axis of the pivot 7. In other words, assuming that the axis of the pivot 7 is exactly vertical, and that the axis of the spindle 14 is exactly horizontal, because of the pivot seats in the bearing element 22 being worn, the action of the wedges 24 against the wedge elements 22, and the walls of the cavities 11 and 12, will force the outer end of the spindle 14 downward, assuming that the axis of the pivot 7 remains vertical. On the other hand, it will be understood that the weight of the vehicle on its spindles 14 constantly tends to tip the outer ends of the spindles upward, thereby exerting practically all of the pressure on the wedge elements 22, and thereby relieving the bearing elements 15 of such pressure that would cause them to wear rapidly. In other words, the far greater part of the wear takes place in the pivot seats of the wedge elements 22, and since these wedge elements are quickly and easily adjustable by screwing the screws 19 inward, so that by periodically attending to these slight adjustments, the disadvantages and dangers of "shimmying" are avoided.

Although any appropriate means may be provided for preventing retrograde movement of the adjusting screws 19, I prefer to employ the hollow bolt-locks or caps 25. The cavity 26 of each member 25 conforms to the peripheral contour of either head of the screws 19; for instance, where hexagonal heads are employed on the screws 19, as shown, the internal contour of the members 25 is hexagonal, although it is understood that any internal contour, except cylindrical, may be employed, provided it conforms to the contour of the adjusting screw heads. Each member 25 is provided with a flange which has one surface or main side flush with the open side of the cavity 26, this flange being indicated at 27 and being provided with a bolt-hole or screw-hole 28 through which one of the screws 21 may extend for securing the member 25 in position to lock against retrograde movement the adjusting screw 19 which is contained therein. However, the flange 27 of each member 25 may have its aperture 28 in registration with either of the oil inlets 18, and the latter may be threaded to receive the respective screw or plug 20, which latter not only closes the oil inlet, but also secures the retaining caps 25 in place. These caps 25 also protect the threads of the adjusting screws against dust, moisture, and other agencies which tend to rust and clog the threads, it being understood that the joints between these caps and the respective plates may be rendered water-tight by means of gaskets or other appropriate means (not shown).

A considerable space is provided between the elements 15 and 22 of each cavity 11 and 12, which not only permits of the desired adjustments, but also provides means of ready access of oil or other lubricating material with which the cavities 11 and 12 may be filled through the inlets 18.

It is not my intention to limit my patent protection to the exact details of construction and arrangement here described and shown, but changes may be made without departure from the inventive ideas as implied and claimed.

What I claim as my invention is:

1. An adjustable axle joint including an axle member, a pivot having a substantially vertical axis and having its intermediate portion embraced by said axle member, a second axle member, the latter having upper and lower furcations provided with cavities therein respectively, a pair of bearing elements in each of said cavities and receiving the upper and lower ends of the pivot between the bearing elements of each pair, these bearing elements of each pair being spaced from one another, a wedge against the inner side of the inner bearing element of the lower pair, a wedge against the outer side of the outer bearing member of the upper pair, and means to actuate these wedges for pressing the lower end of said second axle member inward and pressing the upper end thereof outward with respect to the axis of said pivot, substantially as described.

2. The structure defined by claim 1, said means including a plate covering one of said cavities, and retaining a bearing element therein, and an adjusting screw threaded in and extending through said plate and being operable to force the adjacent wedge between the other bearing element and the wall of this cavity.

3. The structure defined by claim 1, said means including a plate covering each of said cavities, each of these plates having an adjusting screw threaded therein and operable to push the wedges inwardly of the cavities, each of said plates having an oil inlet therethrough in communication with the respective cavities, a pair of caps having non-cylindrical cavities conforming to the heads of the adjusting screws, and enclosing the latter respectively, each of said caps being provided with an apertured flange, and a plug for each flange, each of these plugs extending through its flange of the respective cap and engaging with the oil inlets for closing the latter while securing the respective caps in position for locking and protecting the respective adjusting screw.

In testimony whereof I affix my signature.

LAWRENCE M. BARSTOW.